(12) United States Patent
Chen

(10) Patent No.: US 10,702,103 B2
(45) Date of Patent: Jul. 7, 2020

(54) FLIP-TOP WASHING DEVICE FOR VEGETABLES AND FRUITS

(71) Applicant: Chien-Hua Chen, Taoyuan (TW)

(72) Inventor: Chien-Hua Chen, Taoyuan (TW)

( * ) Notice: Subject to any disclaimer, the term of this patent is extended or adjusted under 35 U.S.C. 154(b) by 2 days.

(21) Appl. No.: 16/007,090

(22) Filed: Jun. 13, 2018

(65) Prior Publication Data

US 2019/0029471 A1 Jan. 31, 2019

(30) Foreign Application Priority Data

Jul. 31, 2017 (TW) .............................. 106125701 A

(51) Int. Cl.
*A47J 43/24* (2006.01)

(52) U.S. Cl.
CPC ..................................... *A47J 43/24* (2013.01)

(58) Field of Classification Search
CPC ..................................................... A47J 43/24
USPC ........................................................ 134/121
See application file for complete search history.

(56) References Cited

FOREIGN PATENT DOCUMENTS

| CN | 202858910 U | 4/2013 |
|---|---|---|
| CN | 203153500 U | 8/2013 |
| JP | 3210319 U | 5/2017 |
| TW | M345572 U | 12/2008 |
| TW | M366908 U | 10/2009 |
| TW | M523409 U | 6/2016 |

*Primary Examiner* — Levon J Shahinian
(74) *Attorney, Agent, or Firm* — Alan D. Kamrath; Karin L. Williams; Mayer & Williams PC

(57) ABSTRACT

A flip-top washing device for vegetables and fruits has a housing assembly, a cover assembly pivotally connected to the housing assembly, a driving assembly mounted on the cover assembly, a washing basket mounted in the housing assembly, and an agitating panel assembly mounted on and connected with the washing basket. With multiple driving blocks of a driving member on the cover assembly and multiple connecting blocks on the agitating panel assembly and with an inclined surface and an vertical surface of each of the driving and connecting blocks, the driving member is able to be securely connected with the agitating panel assembly when closing the cover assembly onto the housing assembly. As the agitating panel assembly and the washing basket rotate, water inside the housing assembly is, strongly agitated so as to wash the vegetables and the fruits in the housing assembly.

14 Claims, 8 Drawing Sheets

FLIP-TOP WASHING DEVICE FOR VEGETABLES AND FRUITS

CROSS-REFERENCE TO RELATED APPLICATIONS

This application is based upon and claims priority under 35 U.S.C. 119 from Taiwan Patent Application No. 106125701 filed on Jul. 31, 2017, which is hereby specifically incorporated herein by this reference thereto.

BACKGROUND OF THE INVENTION

1. Field of the Invention

The present invention relates to a washing device, especially to a flip-top washing device that washes vegetables and fruits by agitating water.

2. Description of the Prior Art(s)

A conventional washing device for vegetables and fruits comprises a housing, a washing basket, and a cover. The washing basket is mounted in the housing and can be driven to perform washing function. The cover is detachably mounted on the housing. When using the conventional washing device, the vegetables and the fruits along with water are put into the washing basket which is disposed in the housing. After closing the cover, the washing basket is driven to agitate the water. Thus, the vegetables and the fruits can be cleaned by the agitated water. Accordingly, the conventional washing device can be used to wash the vegetables and the fruits.

However, for using the conventional washing device, a user has to remove the cover from the housing in advance, and then puts the vegetables and the fruits along with the water into the washing basket which is disposed in the housing. Next, the user closes the cover tightly and starts to agitate the water to clean the vegetables and the fruits. After the vegetables and the fruits are cleaned, the user removes the cover from the housing again, and takes the vegetables, the fruits, and the washing basket out of the housing, and then drains the water from the housing. Therefore, it is rather inconvenient and troublesome to user the conventional washing device, and is time-consuming to wash the vegetables and the fruits.

To overcome the shortcomings, the present invention provides a flip-top washing device for vegetables and fruits to mitigate or obviate the aforementioned problems.

SUMMARY OF THE INVENTION

The main objective of the present invention is to provide a flip-top washing device for vegetables and fruits. The washing device has a cover assembly, a housing assembly, a driving assembly, an agitating panel assembly, and a washing basket.

The cover assembly has an upper pivotal seat disposed on a rear portion of the cover assembly, a fastening part disposed on a front portion of the cover assembly, and an assembling portion fabricated on a center portion of the cover assembly.

The housing assembly is hollow and has a pivot mechanism, an open-close mechanism, and a stabilizing shaft. The pivot mechanism is fabricated on a top portion of the housing assembly and has a lower pivotal seat. The lower pivotal seat is located on a rear portion of the housing assembly and is pivotally connected with the upper pivotal seat of the cover assembly. The cover assembly is pivotally connected with the housing assembly via the pivot mechanism so as to open or close the cover assembly. The open-close mechanism is installed on the top portion of the housing assembly and has a fastening seat. The fastening seat corresponds in position to the fastening part of the cover assembly. The fastening seat detachably engages with the fastening part of the cover assembly when closing the cover assembly onto the housing assembly. The stabilizing shaft protrudes from a bottom portion defined inside the housing assembly.

The driving assembly is mounted on the cover assembly and has a base securely positioned on the assembling portion of the cover assembly, a motor installed on the base, and a driving member installed on the base and connected with the motor. The driving member is driven by the motor and has multiple driving blocks separately arranged in a circle. Each of the driving blocks is formed with a vertical surface and an inclined surface extending to connect with each other.

The agitating panel assembly is mounted on the housing assembly and comprises a base panel, multiple combination tabs protruding down from a lower surface of the base panel, a connecting recess formed in a center portion of the base panel, and multiple connecting blocks protruding from an inner sidewall of the base panel and separately arranged in a circle. The inner sidewall of the base panel is defined around the connecting recess. Each of the connecting blocks is formed with a vertical surface and an inclined surface extending to connect with each other.

The washing basket is hollow, is mounted in the housing assembly, and has an upper opening formed on a top of the washing basket, an upper end edge defined around the upper opening of the washing basket, a pivot seat disposed on a bottom of the washing basket and rotatably mounted around the stabilizing shaft, multiple orifices formed through the washing basket, and multiple engaging recesses. The engaging recesses are formed in an inner side surface of the washing basket, are disposed adjacent to the upper end edge of the washing basket, and engage with the combination tabs of the agitating panel assembly.

The cover assembly and the housing assembly are pivotally connected with each other and the cover assembly can be opened automatically. When closing the cover assembly onto the housing assembly, the fastening member of the housing assembly is fastened onto the fastening part of the cover assembly. As the fastening member of the housing assembly and the fastening part of the cover assembly are unfastened, the cover assembly will be automatically opened. Thus, a user can open and close the cover assembly in a simple and quick way.

Moreover, with the driving blocks of the driving member on the cover assembly and the connecting blocks in the connecting recess of the agitating panel assembly and with the mutually connected inclined surface and vertical surface of each of the driving blocks or each of the connecting blocks, the driving member is able to be securely connected with the agitating panel assembly when the cover assembly is closed onto the housing assembly. As the agitating panel assembly and the washing basket rotate, water inside the housing assembly is strongly agitated so as to wash the vegetables and the fruits in the housing assembly.

Other objectives, advantages and novel features of the invention will become more conspicuous from the following detailed description when taken in conjunction with the accompanying drawings.

BRIEF DESCRIPTION OF THE DRAWINGS

FIG. 4 is a cross-sectional side view of the flip-top washing device in

DETAILED DESCRIPTION OF THE PREFERRED EMBODIMENTS

Figure 1:
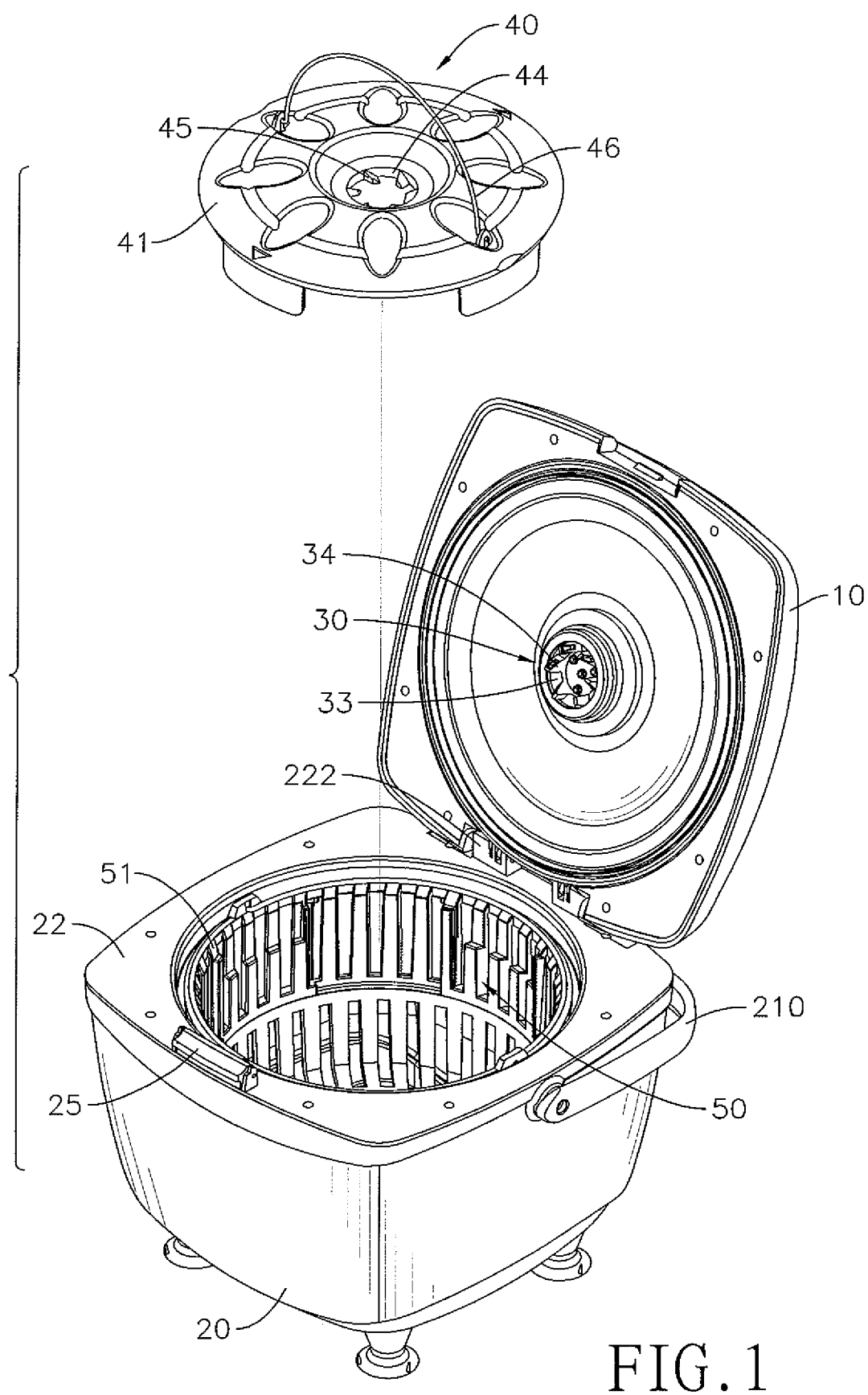
FIG. 1 is a partially exploded perspective view of a flip-top washing device for vegetables and fruits in accordance with the present invention, shown opened.
Figure 2:
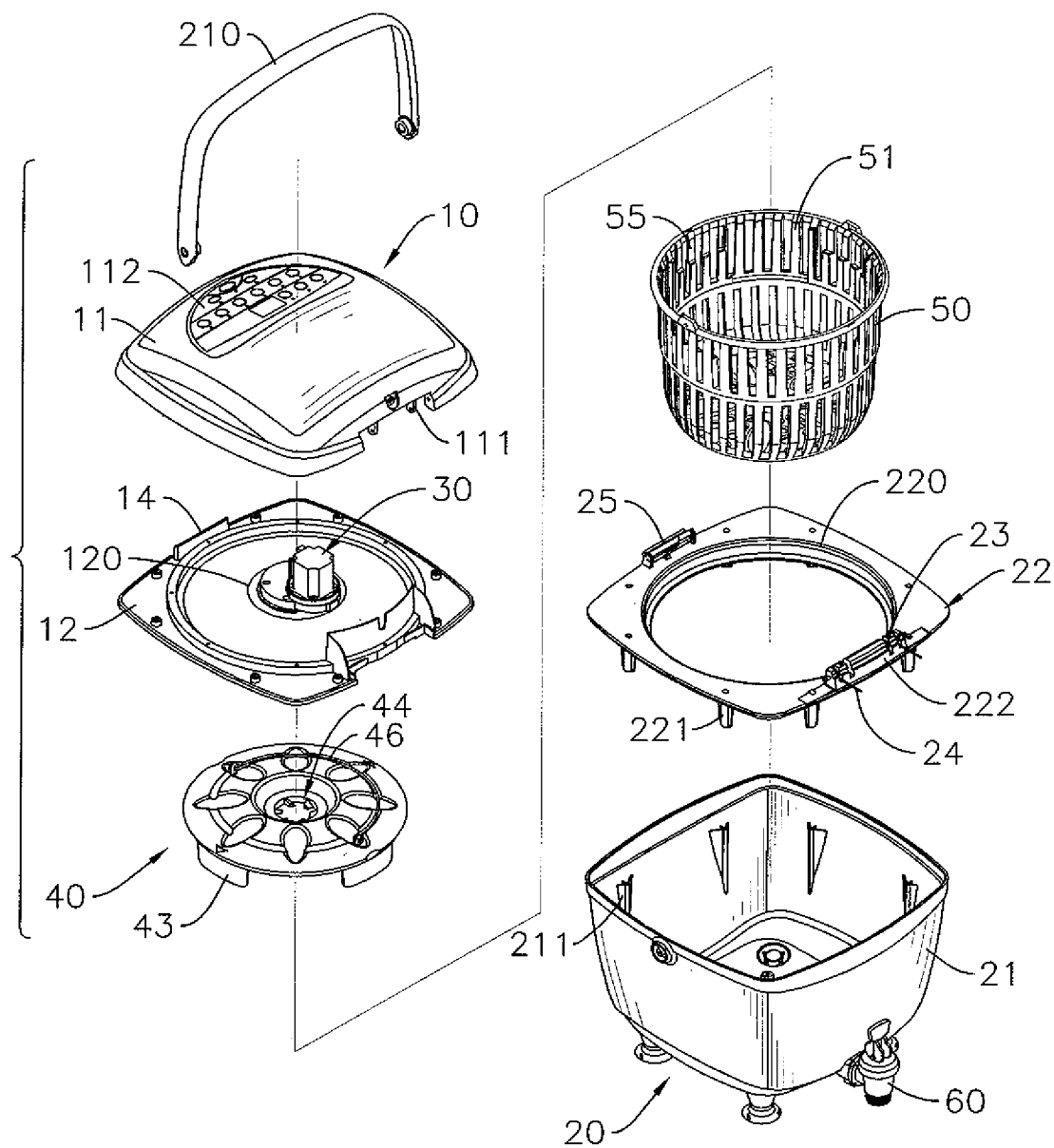
FIG. 2 is an exploded perspective view of the flip-top washing device in FIG. 1.

With reference to FIGS. 1 and 2, a flip-top washing device for vegetables and fruits in accordance with the present invention comprises a cover assembly 10, a housing assembly 20, a driving assembly 30, an agitating panel assembly 40, a washing basket 50, and a drain module 60.

The cover assembly 10 has a rear portion, a front portion, a center portion, an upper pivotal seat 111, a fastening part 14, and an assembling portion 120. The upper pivotal seat 111 is disposed on the rear portion of the cover assembly 10. The fastening part 14 is disposed on the front portion of the cover assembly 10. The assembling portion 120 is fabricated on the center portion of the cover assembly 10.

Figure 3:
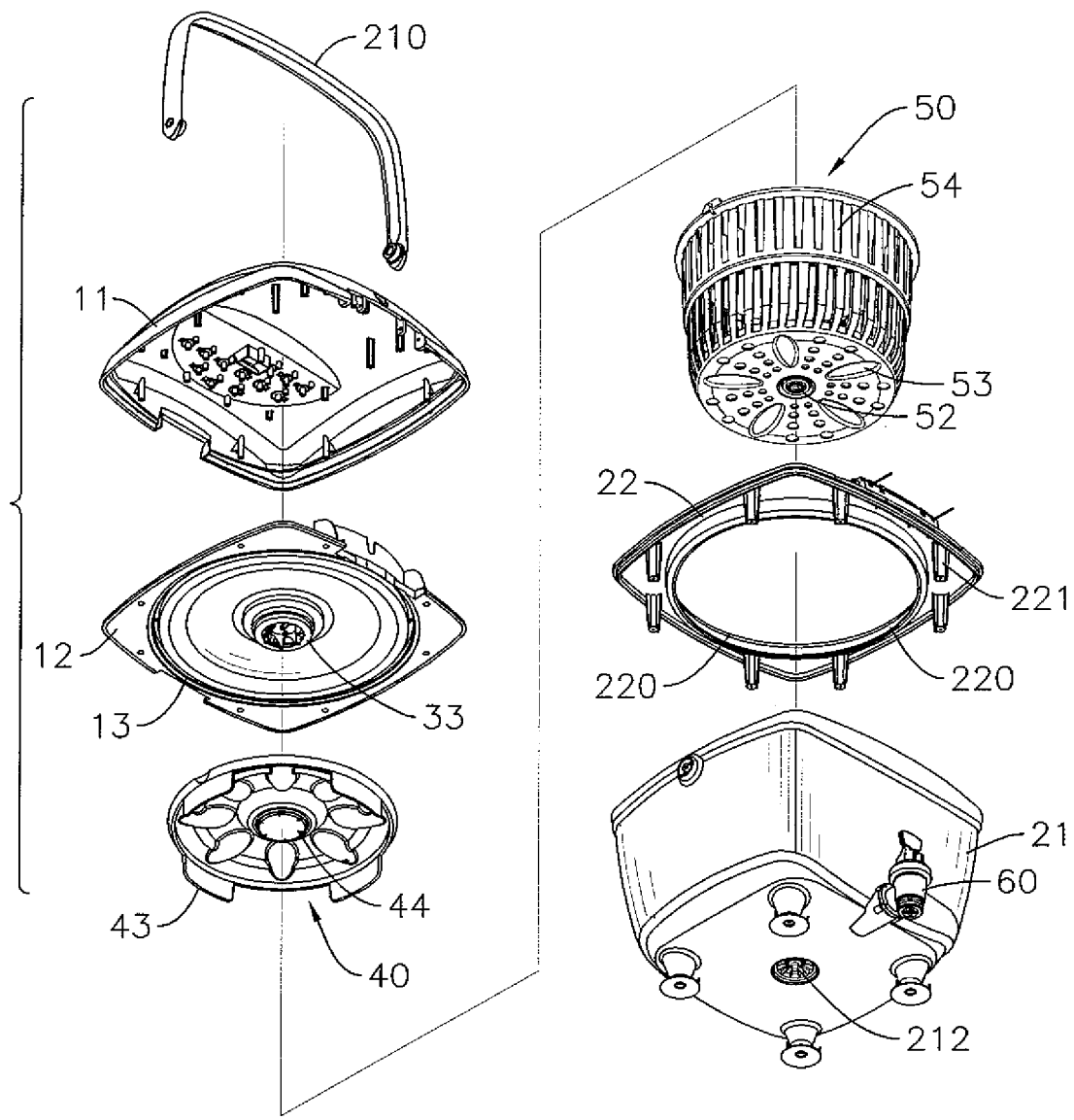
FIG. 3 is another exploded perspective view of the flip-top washing device in FIG. 1.

With further reference to FIG. 3, specifically, the cover assembly 10 includes an upper cover 11, a control panel 112, a lower panel 12, and a sealing ring 13. The upper cover 11 has a rear end. The upper pivotal seat 111 of the cover assembly 10 is disposed on the rear end of the upper cover 11. The control panel 112 is mounted on the upper cover 11 and is used to control all kinds of functions of the present invention.

Figure 4:
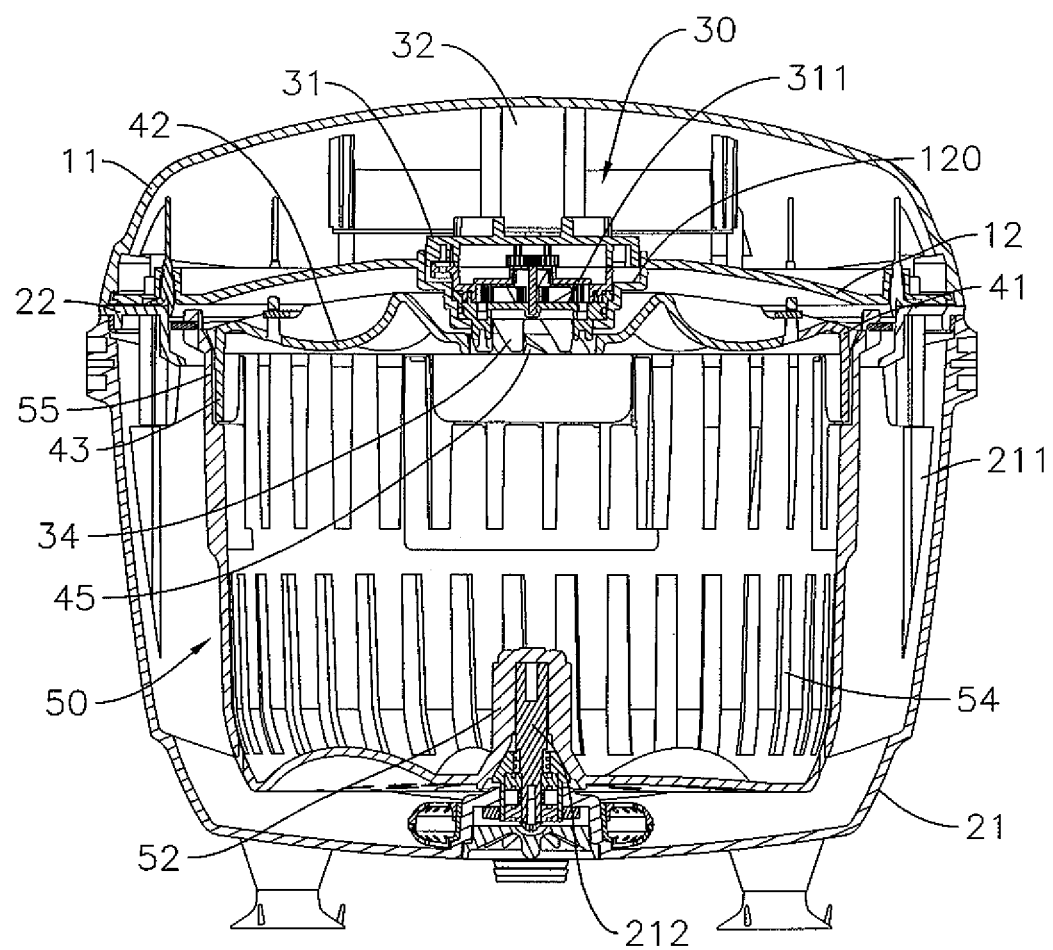
Figure 6:
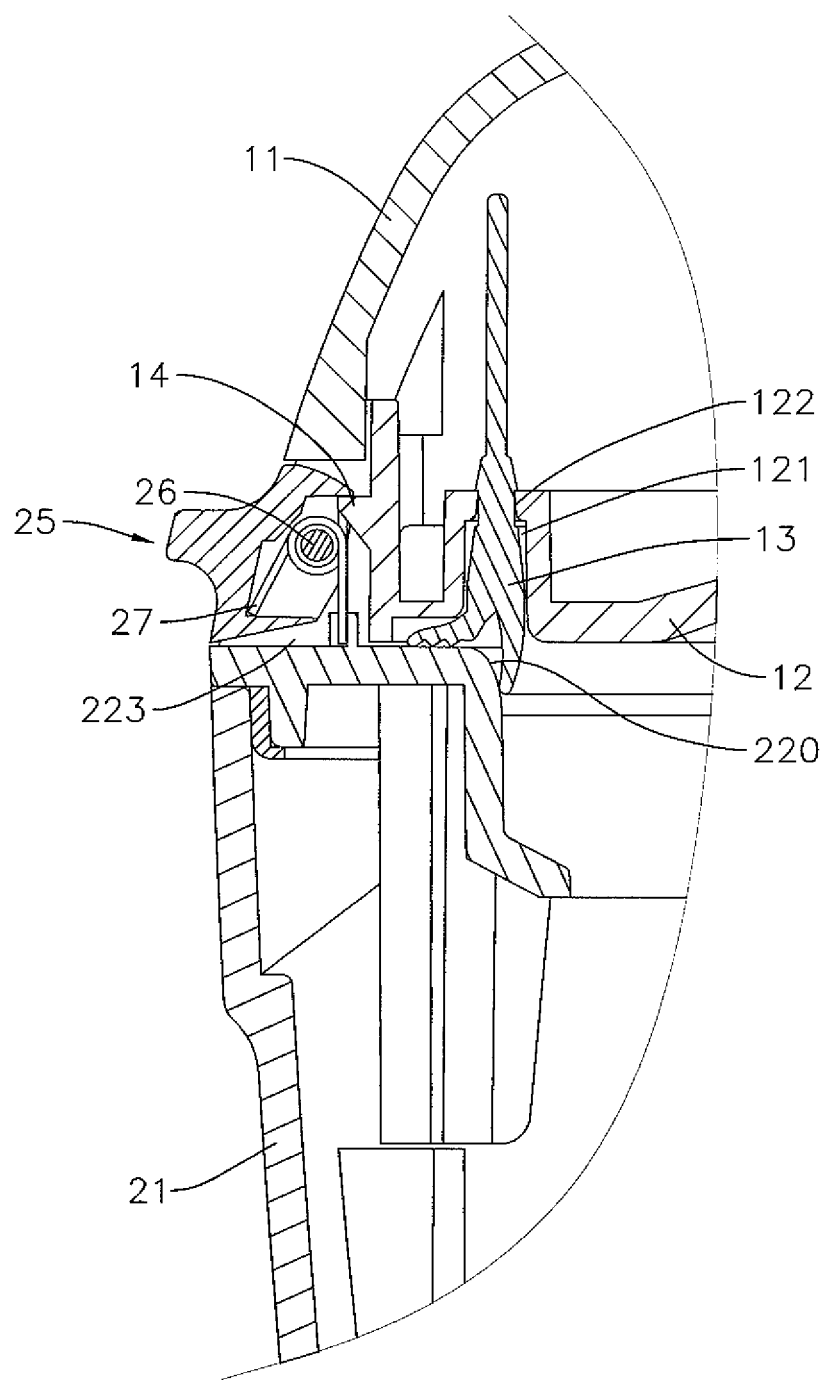
FIG. 6 is another enlarged cross-sectional side view of the flip-top washing device in FIG. 1.
Figure 7:
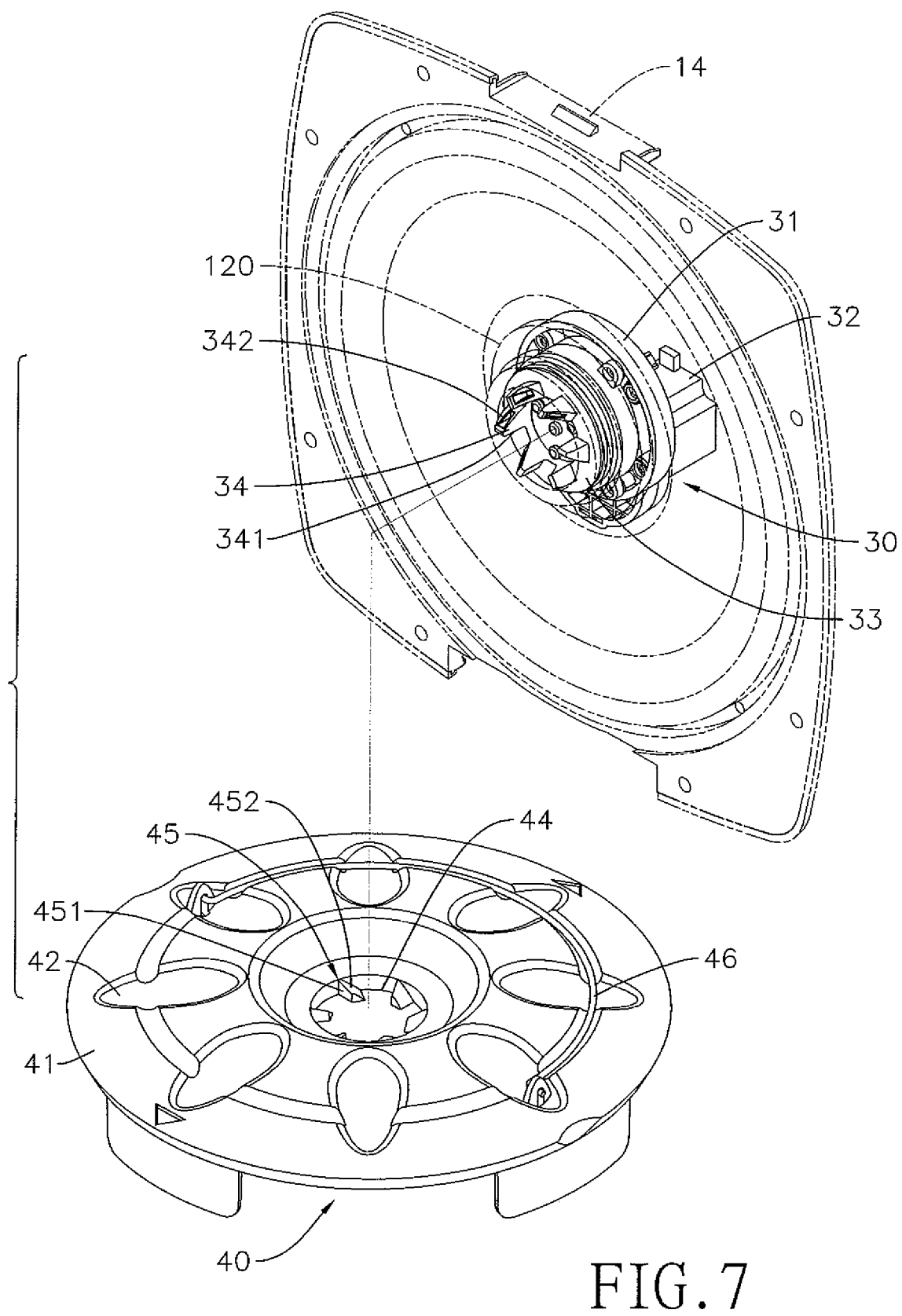
FIG. 7 is an exploded perspective view of an agitating panel assembly and a driving assembly on a cover assembly of the flip-top washing device in FIG. 1.

With further reference to FIGS. 4 and 6, the lower panel 12 is combined with the upper cover 11 and has a front end, a bottom surface, an annular groove 121, and multiple mounting holes 122. The annular groove 121 is formed in the bottom surface of the lower panel 12. The mounting holes 122 are separately formed through a groove bottom defined in the annular groove 121. The assembling portion 120 of the cover assembly 10 is located on a center of the lower panel 12 and has a mounting recess and a through hole. The mounting recess is formed in the lower panel 12. The through hole is formed through a recess bottom defined in the mounting recess. Preferably, the annular groove 121 and the assembling portion 120 are concentric.

The sealing ring 13 is embedded in the annular groove 121 and has an upper annular portion, a lower annular portion, and multiple protruding rods. The upper annular portion of the sealing ring 13 engages in the annular groove 121 of the lower panel 12. The lower annular portion of the sealing ring 13 protrudes out of the annular groove 121. The protruding rods separately protrude from the upper annular portion of the sealing ring 13 and are respectively mounted through the mounting holes 122 of the lower panel 12.

The fastening part 14 of the cover assembly 10 is formed on the front end of the lower panel 12. In the preferred embodiment, the fastening part 14 has a protrusion protruding from a sidewall of the fastening part 14.

With reference to FIGS. 2, 3, and 4, the housing assembly 20 is hollow and has a top portion, a rear portion, a front portion, a pivot mechanism, an open-close mechanism, and a stabilizing shaft 212. The pivot mechanism is fabricated on the top portion of the housing assembly 20 and has a lower pivotal seat 222. The lower pivotal seat 222 is located on a rear portion of the housing assembly 20 and is pivotally connected with the upper pivotal seat 111 of the cover assembly 10. The cover assembly 10 is pivotally connected with the housing assembly 20 via the pivot mechanism so as to open or close the cover assembly 10. The open-close mechanism is installed on the top portion of the housing assembly 20 and has a fastening seat 223. The fastening seat 223 is located at the front portion of the housing assembly 20 and corresponds in position to the fastening part 14 of the cover assembly 10. The fastening seat 223 detachably engages with the fastening part 14 of the cover assembly 10 when the cover assembly 10 is closed onto the housing assembly 20. The stabilizing shaft 212 protrudes from a bottom portion defined inside the housing assembly 20.

Specifically, the housing assembly 20 includes a housing 21 and a top panel 22. The housing 21 is hollow and has an upper opening, an inner side surface, a bottom panel, and multiple positioning seats 211. The bottom panel of the housing 21 is defined as the bottom of the housing assembly 20. The positioning seats 211 are separately mounted on the inner side surface of the housing 21 and are disposed adjacent to the upper opening of the housing 21. The stabilizing shaft 212 of the housing assembly 20 is disposed inside the housing 21 and protrudes up from the bottom panel of the housing 21. The top panel 22 is mounted at the upper opening of the housing 21, is combined with the housing 21, and has a rear end, a front end, a lower surface, a receiving hole 220, and multiple positioning rods 221. The receiving hole 220 is defined through the top panel 22. The positioning rods 221 separately protrudes down from the lower surface of the top panel 22 and are respectively connected with the positioning seats 211 via fasteners. Said fasteners may be screws. The sealing ring 13 tightly abuts against the top panel 22 when the cover assembly 10 is closed onto the housing assembly 20.

Figure 5:
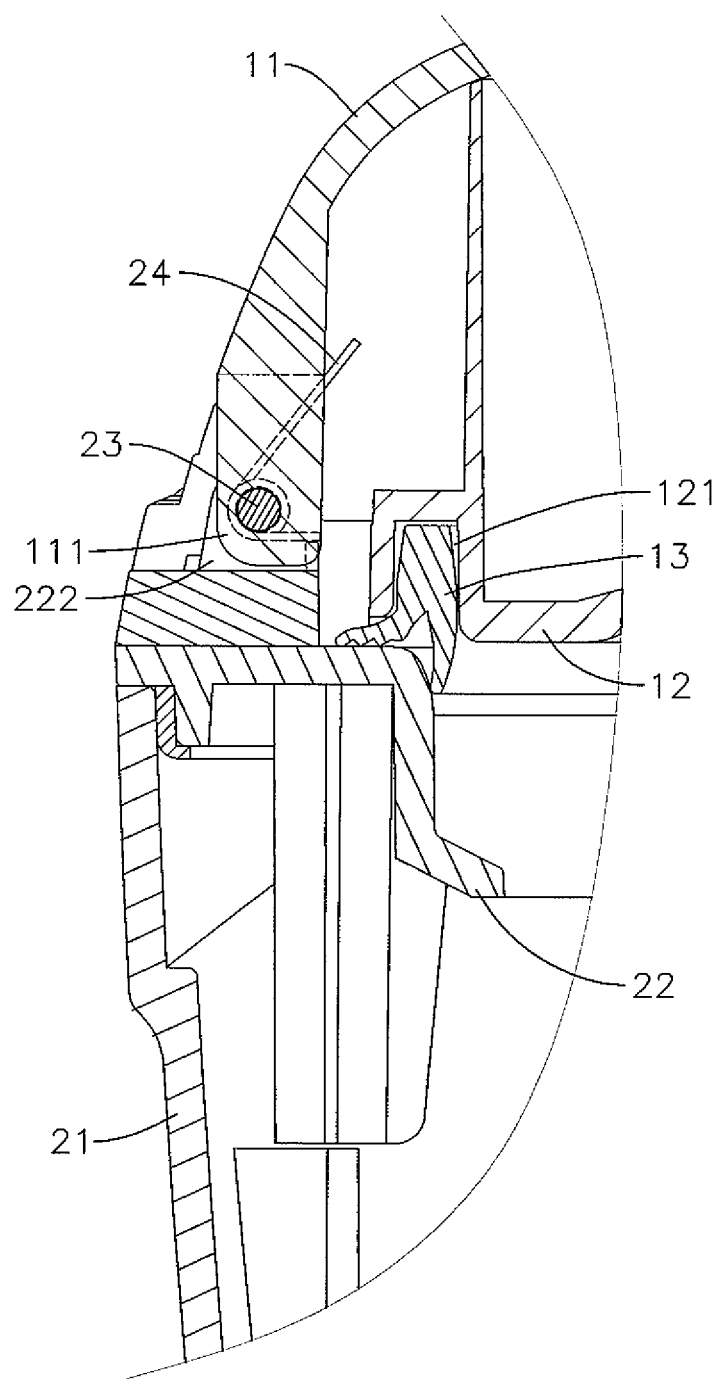
FIG. 5 is an enlarged cross-sectional side view of the flip-top washing device in FIG. 1.

With reference to FIGS. 2, 5, and 6, the lower pivotal seat 222 of the pivot mechanism of the housing assembly 20 is mounted on the rear end of the top panel 22, and the pivot mechanism further has a first pivot rod 23 and a first resilient element 24. The first pivot rod 23 is mounted through the lower pivotal seat 222 and the upper pivotal seat 111 of the upper cover 11. The first resilient element 24 is mounted on the first pivot rod 23 and has two ends respectively abutting against the upper cover 11 and the top panel 22, such that the first resilient element 24 pushes the upper cover 11 to pivot to open relative to the top panel 22. Said first resilient element 24 may be a torsion spring.

The fastening seat 223 of the open-close mechanism of the housing assembly 20 is mounted on the front end of the top panel 22, and the open-close mechanism further has a fastening member 25, a second pivot rod 26, and a second resilient element 27. The fastening member 25 is mounted to the fastening seat 223. The second pivot rod 26 is mounted through the fastening member 25 and the fastening seat 223. The second resilient element 27 is mounted on the second pivot rod 26 and has two ends respectively abutting against the fastening member 25 and the top panel 22, such that the second resilient element 27 pushes the fastening member 25 to pivot to engage with the fastening part 14 of the cover assembly 10 when the cover assembly 10 is closed onto the housing assembly 20. Said first resilient element 24 may be a torsion spring.

In the preferred embodiment, an outer handle 210 is mounted to the top portion of the housing assembly 20 and is pivotally connected to the housing assembly 20. A user can lift and move the washing device of the present invention by holding the outer handle 210.

With reference to FIGS. 2 to 4 and 7, the driving assembly 30 is mounted on the cover assembly 10 and has a base 31, a motor 32, and a driving member 33. The base 31 is securely positioned on the assembling portion 120 of the cover assembly 10. The motor 32 is installed on the base 31. The driving member 33 is installed on the base 31, is connected with the motor, is driven by the motor 32, and has multiple driving blocks 34. The driving blocks 34 are separately arranged in a circle. Each of the driving blocks 34 is formed with a vertical surface 341 and an inclined surface 342 extending to connect with each other.

Specifically, the base 31 is mounted through the assembling portion 120 on the lower panel 12 of the cover assembly 10 and includes a mounting support and a gear set 311. The mounting support is hollow and two opposite ends. The motor 32 is mounted on one of the ends of the mounting support. The driving member 33 is mounted on the other end of the mounting support and protrudes down from the lower panel 12. The gear set 311 is embedded in the mounting support and has an input end and an output end. The input end of the gear set 311 is connected with the motor 32. The output end of the gear set 311 is connected with the driving member 33. On the driving member 33, the vertical surface 341 of one of the driving blocks 34 is disposed next to the inclined surface 342 of an adjacent one of the driving blocks 34.

The agitating panel assembly 40 is mounted on the housing assembly 20 and comprises a base panel 41, multiple first agitating protrusions 42, multiple combination tabs 43, a connecting recess 44, multiple connecting blocks 45, and an inner handle 46.

The base panel 41 has a lower surface, an upper surface, a center portion, and an inner sidewall. The first agitating protrusions 42 separately protrude down from the lower surface of the base panel 41 and are arranged in a circle. The combination tabs 43 protrude down from the lower surface of the base panel 41.

The connecting recess 44 is formed in the center portion of the base panel 41. The inner sidewall of the base panel 41 is defined around the connecting recess 44. The connecting blocks 45 protrude from the inner sidewall of the base panel 41 and are separately arranged in a circle. Each of the connecting blocks 42 is formed with a vertical surface 451 and an inclined surface 452 extending to connect with each other. When closing the cover assembly 10 onto the housing assembly 20, the connecting recess 44 is mounted around the driving member 33 of the driving assembly 30 and the connecting blocks 45 engage with the driving blocks 34 of the driving member 33.

The inner handle 46 is mounted on the upper surface of the base panel 41 and is pivotally connected to the base panel 41. The user can lift and move the agitating panel assembly 40 by holding the inner handle 46.

With reference to FIGS. 2 to 4, the washing basket 50 is hollow, is mounted in the housing assembly 20, and has a bottom, an inner side surface, an upper opening 51, an upper end edge, a pivot seat 52, multiple second agitating protrusions 53, multiple orifices 54, and multiple engaging recesses 55. The upper opening 51 of the washing basket 50 is formed on a top of the washing basket 50. The upper end edge of the washing basket 50 is defined around the upper opening of the washing basket 50. The pivot seat 52 is disposed on the bottom of the washing basket 50 and is rotatably mounted around the stabilizing shaft 212. The second agitating protrusions 53 separately protrude up from the bottom of the washing basket 50 and are arranged around the pivot seat 52 in a circle. The orifices 54 are formed through the washing basket 50. The engaging recesses 55 are formed in the inner side surface of the washing basket 50, are disposed adjacent to the upper end edge of the washing basket 50, and engage with the combination tabs 43 of the agitating panel assembly 40.

As shown in FIGS. 2 and 3, the drain module 60 is mounted to a lower portion of the housing assembly 20 and communicates an interior of the housing assembly 20 to an exterior of the housing assembly 20. In the preferred embodiment, the drain module 60 is a water flow switch.

When using the washing device of the present invention, the user only needs to simply press the fastening member 25, then the cover assembly 10 would pivot upwardly to open relative to the housing assembly 20. Thus, the user can lift and move the agitating panel assembly 40 by holding the inner handle 46, and the vegetables and the fruits to be cleaned and water can be put into the washing basket 50 from the upper opening 51 of the washing basket 50. Next, the user closes the upper opening 51 of the washing basket 50 with the agitating panel assembly 40. The combination tabs 43 of the agitating panel assembly 40 respectively engage in the engaging recesses 55 of the washing basket 50, such that the agitating panel assembly 40 is securely connected with the washing basket 50. Then the user simply presses the cover assembly 10 to allow the cover assembly 10 to pivot relative to and to close the housing assembly 20.

Figure 8:
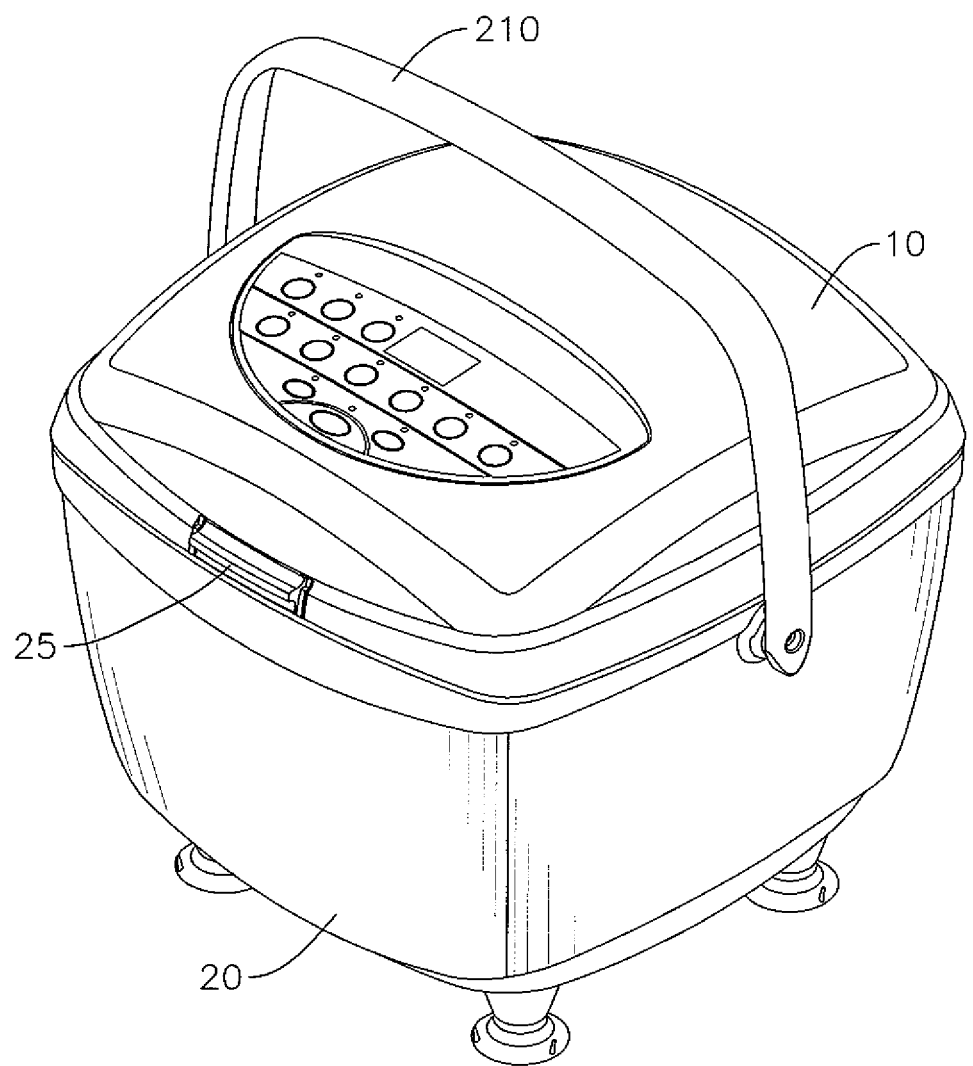
FIG. 8 is a perspective view of the flip-top washing device in FIG. 1, shown closed.

As shown in FIGS. 4 and 8, when the cover assembly 10 is closed onto the housing assembly 20, the sealing ring surrounds the receiving hole 220 and tightly abuts against the top panel 22, and the driving blocks 34 of the driving member 33 of the driving assembly 30 engage with the connecting blocks 45 in the connecting recess 44 of the agitating panel assembly 40. The inclined surfaces 342 of the driving blocks 34 and the inclined surfaces 452 of the connecting blocks 45 facilitate engagement of the driving blocks 34 and the connecting blocks 45. Furthermore, as the fastening member 25 of the housing assembly 20 is fastened onto the fastening part 14 of the cover assembly 10, the flip-top cover assembly 10 can be securely connected with the housing assembly 20.

When the motor 32 is activated, the motor 32 drives the driving member 33 to rotate via the gear set 311, and the driving member 33 drives the agitating panel assembly 40 and the washing basket 50 to rotate with the vertical surfaces 341 of the driving blocks 34 of the driving member 33 respectively abutting against the vertical surface 451 of the connecting blocks 45 in the connecting recess 44. As the agitating panel assembly 40 and the washing basket 50 rotate, the water inside the housing assembly 20 is strongly agitated so as to wash the vegetables and the fruits in the housing assembly 20.

Even though numerous characteristics and advantages of the present invention have been set forth in the foregoing description, together with details of the structure and features of the invention, the disclosure is illustrative only.

Changes may be made in the details, especially in matters of shape, size, and arrangement of parts within the principles of the invention to the full extent indicated by the broad general meaning of the terms in which the appended claims are expressed.

What is claimed is:

1. A flip-top washing device for vegetables and fruits comprising:
   a cover assembly having
      an upper cover;
      a lower panel combined with the upper cover;
      an upper pivotal seat disposed on a rear end of the upper cover;
      a fastening part formed on a front end of the lower panel; and
      an assembling portion fabricated on a center portion of the cover assembly;
   a housing assembly being hollow and having
      a housing having an upper opening;
      a top panel mounted at the upper opening of the housing and combined with the housing;
      a pivot mechanism fabricated on a top portion of the housing assembly and having a lower pivotal seat, and the lower pivotal seat located on a rear portion of the housing assembly, mounted on a rear end of the top panel, and pivotally connected with the upper pivotal seat of the cover assembly, wherein the cover assembly is pivotally connected with the housing assembly via the pivot mechanism so as to open or close the cover assembly;
      an open-close mechanism installed on the top portion of the housing assembly and having a fastening seat, and the fastening seat mounted on a front end of the top panel and corresponding in position to the fastening part of the cover assembly, wherein the fastening seat detachably engages with the fastening part of the cover assembly when closing the cover assembly onto the housing assembly; and
      a stabilizing shaft protruding from a bottom portion defined inside the housing assembly;
   a driving assembly mounted on the cover assembly and having
      a base securely positioned on the assembling portion of the cover assembly;
      a motor installed on the base; and
      a driving member installed on the base, connected with the motor, driven by the motor, and having multiple driving blocks, the driving blocks separately arranged in a circle, and each of the driving blocks formed with a vertical surface and an inclined surface extending to connect with each other;
   an agitating panel assembly mounted on the housing assembly and comprising
      a base panel having an inner sidewall;
      multiple combination tabs protruding down from a lower surface of the base panel;
      a connecting recess formed in a center portion of the base panel, wherein the inner sidewall of the base panel is defined around the connecting recess; and
      multiple connecting blocks protruding from the inner sidewall of the base panel and separately arranged in a circle, and each of the connecting blocks formed with a vertical surface and an inclined surface extending to connect with each other; and
   a washing basket being hollow, mounted in the housing assembly, and having
      an upper opening;
      an upper end edge defined around the upper opening of the washing basket;
      a pivot seat disposed on a bottom of the washing basket and rotatably mounted around the stabilizing shaft;
      multiple orifices formed through the washing basket; and
      multiple engaging recesses formed in an inner side surface of the washing basket, disposed adjacent to the upper end edge of the washing basket, and engaging with the combination tabs of the agitating panel assembly.

2. The washing device as claimed in claim 1, wherein
   the assembling portion of the cover assembly is located on a center of the lower panel and has
      a mounting recess formed in the lower panel; and
      a through hole formed through a recess bottom defined in the mounting recess;
   the base of the driving assembly is mounted through the assembling portion on the lower panel of the cover assembly; and
   the driving member of the driving assembly protrudes from the lower panel.

3. The washing device as claimed in claim 2, wherein
   the lower panel of the cover assembly has
      an annular groove formed in a bottom surface of the lower panel; and
      multiple mounting holes separately formed through a groove bottom defined in the annular groove;
   the cover assembly further has a sealing ring embedded in the annular groove and having
      an upper annular portion engaging in the annular groove of the lower panel;
      a lower annular portion protruding out of the annular groove; and
      multiple protruding rods separately protruding from the upper annular portion of the sealing ring and respectively mounted through the mounting holes of the lower panel;
   the top panel of the housing assembly has a receiving opening defined through the top panel, wherein the sealing ring tightly abuts against the top panel when closing the cover assembly onto the housing assembly.

4. The washing device as claimed in claim 3, wherein
   the agitating panel assembly has multiple first agitating protrusions separately protruding down from the lower surface of the base panel and arranged in a circle; and
   the washing basket has multiple second agitating protrusions separately protruding up from the bottom of the washing basket and arranged in a circle.

5. The washing device as claimed in claim 4 further comprising a drain module mounted to a lower portion of the housing assembly and communicating an interior of the housing assembly to an exterior of the housing assembly.

6. The washing device as claimed in claim 5, wherein the agitating panel assembly further has an inner handle mounted on an upper surface of the base panel and pivotally connected to the base panel.

7. The washing device as claimed in claim 6, wherein an outer handle is mounted to the top portion of the housing assembly and is pivotally connected to the housing assembly.

8. The washing device as claimed in claim 1, wherein
   the lower panel of the cover assembly has
      an annular groove formed in a bottom surface of the lower panel; and
      multiple mounting holes separately formed through a groove bottom defined in the annular groove;

the cover assembly further has a sealing ring embedded in the annular groove and having
  an upper annular portion engaging in the annular groove of the lower panel;
  a lower annular portion protruding out of the annular groove; and
  multiple protruding rods separately protruding from the upper annular portion of the sealing ring and respectively mounted through the mounting holes of the lower panel;
the top panel of the housing assembly has a receiving opening defined through the top panel, wherein the sealing ring tightly abuts against the top panel when closing the cover assembly onto the housing assembly.

9. The washing device as claimed in claim 8, wherein
the agitating panel assembly has multiple first agitating protrusions separately protruding down from the lower surface of the base panel and arranged in a circle; and
the washing basket has multiple second agitating protrusions separately protruding up from the bottom of the washing basket and arranged in a circle.

10. The washing device as claimed in claim 9 further comprising a drain module mounted to a lower portion of the housing assembly and communicating an interior of the housing assembly to an exterior of the housing assembly.

11. The washing device as claimed in claim 10, wherein the agitating panel assembly further has an inner handle mounted on an upper surface of the base panel and pivotally connected to the base panel.

12. The washing device as claimed in claim 11, wherein an outer handle is mounted to the top portion of the housing assembly and is pivotally connected to the housing assembly.

13. The washing device as claimed in claim 1, wherein the pivot mechanism further has
  a first pivot rod mounted through the lower pivotal seat and the upper pivotal seat; and
  a first resilient element mounted on the first pivot rod and having two ends respectively abutting against the upper cover and the top panel.

14. The washing device as claimed in claim 1, wherein the open-close mechanism further has
  a fastening member mounted to the fastening seat;
  a second pivot rod mounted through the fastening member and the fastening seat; and
  a second resilient element mounted on the second pivot rod and having two ends respectively abutting against the fastening member and the top panel.

* * * * *